(12) United States Patent
Dokic et al.

(10) Patent No.: US 10,788,267 B2
(45) Date of Patent: Sep. 29, 2020

(54) CONDENSER SYSTEM, AND CONDENSATE VESSEL ASSEMBLY FOR POWER PLANT

(71) Applicant: GENERAL ELECTRIC COMPANY, Schenectady, NY (US)

(72) Inventors: Borislav Dokic, Nussbaumen (CH); Enrico Lorenzoni, Windisch (CH); Nemanja Lukovic, Nussbaumen (CH)

(73) Assignee: General Electric Company, Schenectady, NY (US)

( * ) Notice: Subject to any disclaimer, the term of this patent is extended or adjusted under 35 U.S.C. 154(b) by 158 days.

(21) Appl. No.: 16/017,137

(22) Filed: Jun. 25, 2018

(65) Prior Publication Data

US 2019/0390910 A1 Dec. 26, 2019

(51) Int. Cl.
| | |
|---|---|
| F28B 9/08 | (2006.01) |
| F28B 1/02 | (2006.01) |
| F01K 9/00 | (2006.01) |
| F28B 9/02 | (2006.01) |

(52) U.S. Cl.
CPC .............. *F28B 9/08* (2013.01); *F01K 9/00* (2013.01); *F28B 1/02* (2013.01); *F28B 9/02* (2013.01); *F05D 2220/60* (2013.01); *F05D 2220/76* (2013.01)

(58) Field of Classification Search
CPC ...... F28B 9/08; F28B 1/02; F28B 9/02; F28B 1/06; F01K 9/00; F01K 13/00; F05D 2220/60; E04H 5/02
See application file for complete search history.

(56) References Cited

U.S. PATENT DOCUMENTS

| | | | | |
|---|---|---|---|---|
| 2,065,974 A | * | 12/1936 | Marguerre | F01K 3/006 60/659 |
| 4,506,508 A | * | 3/1985 | Coers | F01K 9/003 165/110 |
| 10,161,834 B1 | * | 12/2018 | Henry | F25B 49/00 165/121 |
| 2004/0177614 A1 | * | 9/2004 | Kumagai | F01K 9/003 60/651 |
| 2005/0161202 A1 | * | 7/2005 | Merkys | F28D 1/05383 165/122 |
| 2007/0261421 A1 | * | 11/2007 | Pierson | F01K 23/10 62/175 |
| 2009/0065173 A1 | * | 3/2009 | Wiggs | F25B 30/06 165/45 |

(Continued)

FOREIGN PATENT DOCUMENTS

EP 0050699 B1 * 6/1984 ............... F28B 1/06

OTHER PUBLICATIONS

English Translation EP-0050699-B1 (Year: 1980).*

(Continued)

*Primary Examiner* — Shafiq Mian
(74) *Attorney, Agent, or Firm* — Hoffman Warnick LLC (57) ABSTRACT

A condenser system for steam turbine systems having different loads is disclosed. The condenser system includes a selectively sized outer casing having a variably sized heat exchanger end and an input end for coupling to a steam turbine (ST) system. A condensate vessel sidewall of the casing is positionally uniform relative to the ends regardless of the size of the heat exchanger, and a cooling water sidewall has a position dependent on heat exchanger size.

18 Claims, 7 Drawing Sheets

(56) References Cited

U.S. PATENT DOCUMENTS

| | | | | |
|---|---|---|---|---|
| 2010/0263840 A1* | 10/2010 | Nobel | ............... | F28B 1/06 |
| | | | | 165/120 |
| 2010/0287935 A1* | 11/2010 | Smith | ............... | F01K 9/00 |
| | | | | 60/648 |
| 2010/0319879 A1* | 12/2010 | Sugitani | ............... | F01K 9/00 |
| | | | | 165/104.21 |
| 2012/0111004 A1* | 5/2012 | Conry | ............... | F01K 13/00 |
| | | | | 60/641.2 |
| 2013/0000867 A1* | 1/2013 | Szabo | ............... | F01K 9/003 |
| | | | | 165/96 |
| 2014/0039708 A1* | 2/2014 | Curtis | ............... | F02D 25/00 |
| | | | | 700/288 |
| 2016/0033180 A1* | 2/2016 | Russo | ............... | F24F 1/06 |
| | | | | 165/121 |
| 2017/0051980 A1* | 2/2017 | Singh | ............... | F28F 9/0243 |
| | | | | 165/96 |

OTHER PUBLICATIONS

Sgambati Alessandro, "Double Flashbox System for Combined Cycle Power Plant", Research Disclosure database No. 616055, 3 pages, 2015.

* cited by examiner

CONDENSER SYSTEM, AND CONDENSATE VESSEL ASSEMBLY FOR POWER PLANT

BACKGROUND OF THE INVENTION

The disclosure relates generally to power plants, and more particularly, to a condenser system, and a condensate vessel assembly, for a power plant.

Power plants may include a gas turbine system and a steam turbine system that work together to produce energy, or they may include the same, but separate systems. The gas turbine system combusts a mixture of fuel with an air flow and directs it through a turbine to generate power. Exhaust from the gas turbine may be used in a heat recovery steam generator (HRSG) to create steam or steam may be generated in another manner. In any event, the steam is directed to the steam turbine system to generate power. Piping carries the steam from the HRSG to the steam turbine system. The steam turbine system may have a number of steam turbine segments configured to receive steam from the HRSG having different characteristics. For example, steam may be delivered in a number of steam flow pipes carrying respective high, intermediate and low pressure steam to a high pressure (HP), intermediate pressure (IP) and low pressure (LP) steam turbine segments, respectively. Each steam turbine segment may include its own admission valve(s) that controls flow of steam thereto. The power plant may use one or more generators operatively coupled to the gas turbine and steam turbine systems to generate power. A condenser is positioned downstream of the steam turbine system to condense the steam.

One challenge with condenser systems and related structures is sizing them for the particular environment in which they will operate, e.g., dry desert areas or humid sub-tropical areas require different sized condensers. Typically, each condenser system and its related parts, e.g., condenser casing, heat exchanger, piping layouts, condensate vessels, etc., are custom designed. Consequently, the structures to build each condenser system are typically custom manufactured on site. In view of the foregoing, the condenser systems are very complex and expensive to build.

BRIEF DESCRIPTION OF THE INVENTION

A first aspect of the disclosure provides a condensate vessel assembly for a condenser system of a power plant, the assembly comprising: a first support structure freestanding from the condenser system; a first condensate vessel positioned on the first support structure, the first condensate vessel configured to receive steam condensate from a plurality of drain pipes of a steam turbine system; and a second condensate vessel positioned on the first support structure, the second condensate vessel configured to receive steam condensate from a plurality of condensate pipes of a water steam cycle system for the steam turbine system.

A second aspect of the disclosure provides a condenser system for steam turbine systems having different loads, the condenser system comprising: a selectively sized outer casing having: a heat exchanger end for enclosing a heat exchanger, the heat exchanger having a variable size depending on a load requirement for the condenser system; an input end for coupling to an exhaust of a steam turbine system, a first sidewall extending between the input end and the heat exchanger end, the first sidewall configured to receive exhausted steam from at least one of the first and second condensate vessels, the first sidewall being positionally uniform relative to the heat exchanger end and the input end regardless of the size of the heat exchanger; and a second sidewall opposite the first sidewall, the second sidewall extending between the input end and the heat exchanger end, the second sidewall configured to receive cooling water pipes therethrough for delivering cooling water to and from the heat exchanger, the second sidewall position relative to the heat exchanger end and the input end depending on the size of the heat exchanger.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a power plant and/or condenser system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as steam through the power plant or condenser system. The term "downstream" corresponds to the direction of flow of the fluid, and the term "upstream" refers to the direction opposite to the flow. The terms "forward" and "aft," without any further specificity, refer to directions, with "forward" referring to the front end of the system, and "aft" referring to the rearward end of the system. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The disclosure provides a condenser system for steam turbine systems having different loads. The condenser system includes a selectively sized outer casing having a variably sized heat exchanger end, and an input end for coupling to a steam turbine (ST) system. By "selectively sized," it is meant that a size of the outer casing can be chosen based on a number of variables such as but not limited to: a certain sized power plant, certain size heat exchanger, etc. For example, the heat exchanger size can be selected to address a particular load (based on, e.g., size of power plant, expected steam/condensate load, environment, etc.), and the outer casing sized to accommodate it. The size of the outer casing is not adjusted after manufacture. In order to minimize the customization of piping on-site, a sidewall of the casing is positionally uniform relative to the heat exchanger and input ends of the casing regardless of the size of the heat exchanger. In this fashion, regardless of the on-site demands of the condenser system, the power plant can be built with uniform positioning of ancillary structures for the condenser system on the one side. In contrast, a cooling water sidewall may have a position dependent on heat exchanger size. Structures for supporting cooling water pipes can be custom built off-site and transported to the site to accommodate the varied positions of the cooling water sidewall.

The condenser system provides flexibility in design and due to its uniform positioning of one sidewall accommodates modularization of other structure of the power plant. In particular, embodiments of the disclosure also include a condensate vessel assembly that can be manufactured off-site and transported to the site. In contrast to conventional condensate vessel arrangements, which are typically round vessels coupled to a sidewall of the condenser casing, condensate vessel assembly may include a support structure freestanding from the condenser system, e.g., outer casing, and a first and second condensate vessel on the support structure. The condensate vessels are configured to receive steam condensate from drain pipes of the ST system, or from a plurality of condensate pipes of a steam supply system therefor. In contrast to conventionally round condensate vessels, the disclosed condensate vessels may be rectangular to provide a more compact connection, e.g., not radially arranged about a circular center, for input pipes thereto and output pipes through the sidewall of the condenser casing. Condensate vessel assembly is also made possible by additional floor space being available. In particular, new approaches to piping layouts for water steam cycle (WSC) systems are reconfiguring steam flow pipe thermal expansion portions to be vertically oriented, rather than horizontally oriented, opening space on the power plant floor for other structures such as the condensate vessel assembly disclosed herein. Collectively, the selectively sized outer casing and condensate vessel assembly allow for pre-site manufacture of both structures, making power plant manufacture less complex and less expensive.

Figure 1:
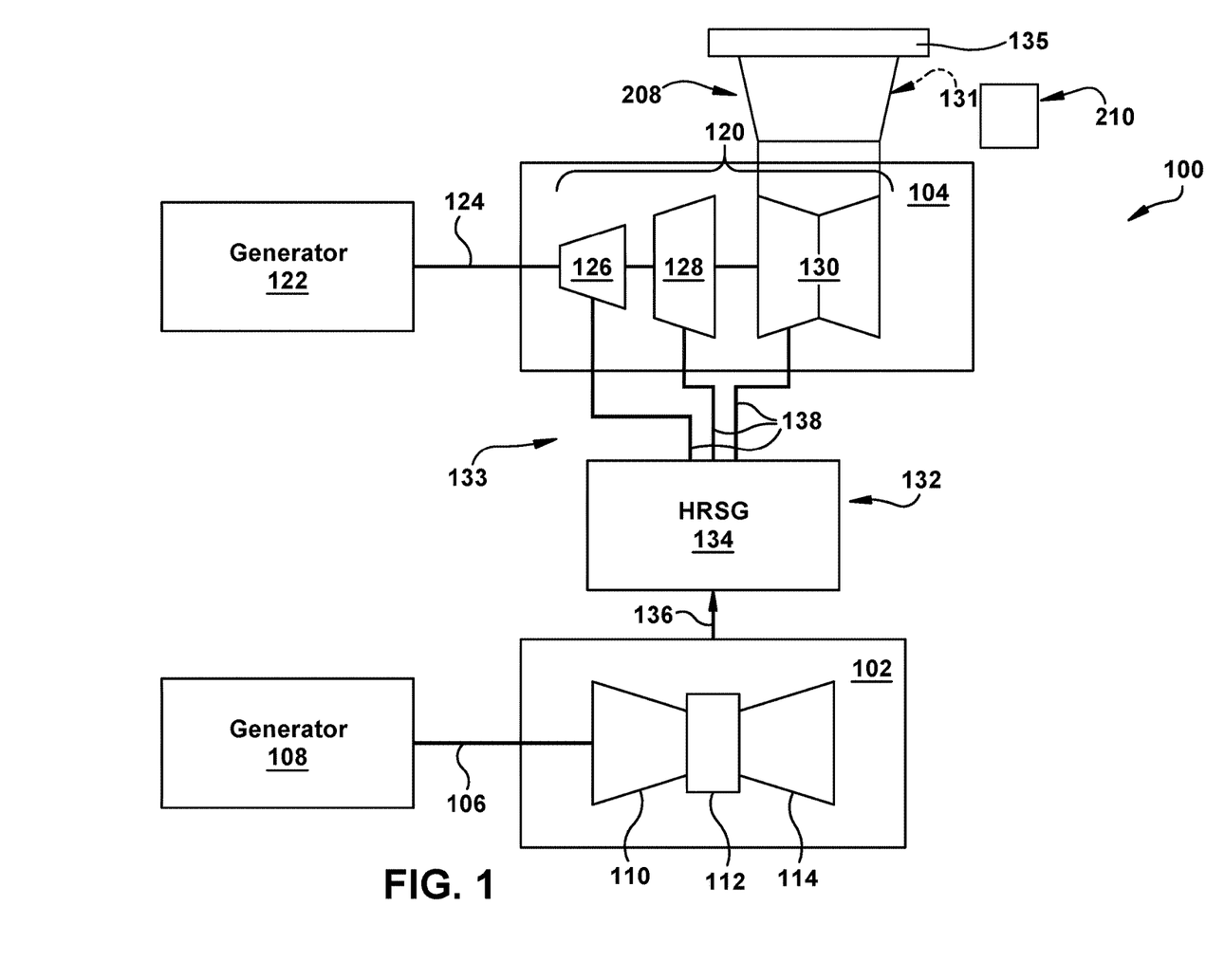
FIG. 1 shows a schematic diagram of an illustrative power plant that may employ the teachings of the disclosure.
Figure 2:
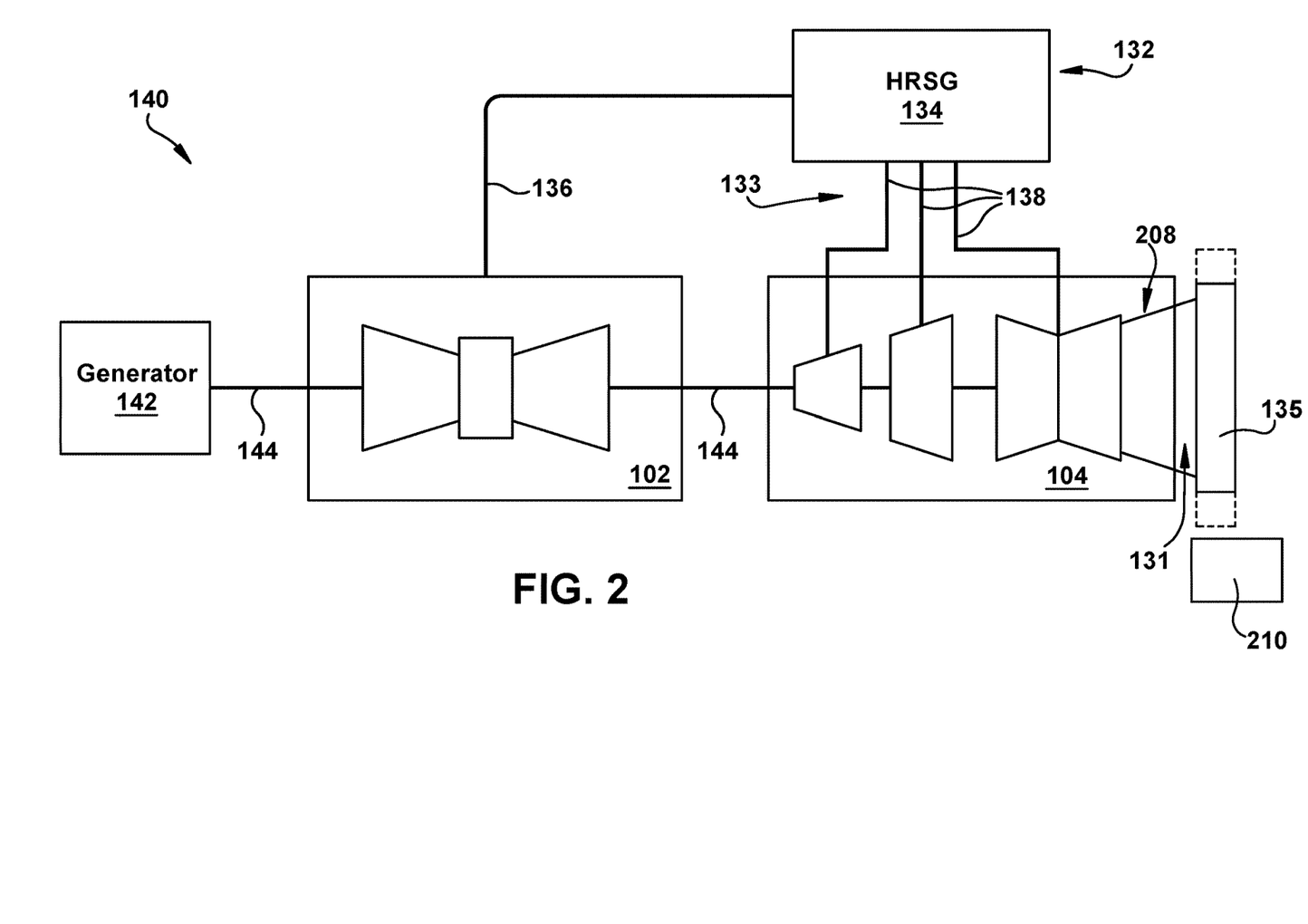
FIG. 2 shows a schematic diagram of another illustrative power plant that may employ the teachings of the disclosure.

Turning to FIGS. 1 and 2, schematic views of portions of illustrative power plants 100, 140 are shown. Power plants 100, 140 are examples of plants in which teachings of the disclosure may be employed. In the examples in FIGS. 1 and 2, the power plants are combined cycle power plants (CCPPs), and in the example in FIG. 3, the power plant includes just a ST system 104. It is emphasized, however, that the teachings of the disclosure are applicable to a wide variety of power plants having a steam turbine system. In the instant example, power plant 100 is a multiple shaft system with two generators and power plant 140 is a single shaft system with one generator. One with skill in the art will readily understand that the teachings of the disclosure are applicable to any variety of power plants including a steam turbine system. Power plants 100, 140 include a steam turbine system 104, and may include a gas turbine system 102.

For power plant 100 in FIG. 1, gas turbine system 102 may be mechanically coupled by a shaft 106 to a first generator 108, which generates electrical energy. Gas turbine system 102 may include a compressor 110 and a combustor 112. Gas turbine system 102 also includes gas turbine 114 coupled to common compressor/turbine shaft 106. In one embodiment, gas turbine system 102 is a MS7001FB engine, sometimes referred to as a 9FB engine, commercially available from General Electric Company, Greenville, S.C. The present disclosure is not limited to any one particular gas turbine system and may be implanted in connection with other engines including, for example, the 7FA, 9FA, 7HA or 9HA engine models of General Electric Company. In operation, air enters the inlet of compressor 110, is compressed and then discharged to combustor 112 where fuel such as a gas, e.g., natural gas, or a fluid, e.g., oil, is burned to provide high energy combustion gases which drive gas turbine 114. In gas turbine 114, the energy of the hot gases is converted into work, some of which is used to drive compressor 110 through rotating shaft 106, with the remainder available for useful work to drive a load such as first generator 108 via shaft 106 for producing electricity.

Steam turbine system 104 includes a steam turbine 120 that is operably coupled to another generator 122 through shaft 124. Steam turbine system 104 may include one or more steam turbine segments, e.g., as shown, a high pressure (HP) segment 126, an intermediate pressure (IP) segment 128 and a low pressure (LP) segment 130. Each segment 126, 128, 130 includes a plurality of rotating blades (not shown) mechanically coupled to shaft 124, which rotate the shaft based on the steam flow thereover. A condenser system 131 may be operably coupled to an appropriate ST segment, e.g., a last-in-line segment such as LP segment 130 (lateral condenser arrangement). Conventional condenser systems 131 include a symmetrical outer casing having a heat exchanger 135 in an end thereof carrying cooling water therein to condense steam. Conventionally, each condenser system 131 is custom designed and built at a location of power plant 100 (FIG. 1) (or 140 (FIG. 2)).

Power plant 100 (FIG. 1) also includes a steam source 132, which may be include a heat recovery steam generator (HRSG) 134 operably connected to gas turbine system 102 and steam turbine system 104. As understood, exhaust 136 from gas turbine system 102 is used by HRSG 134 to create steam flow(s) 138 for use by steam turbine system 104. HRSG 134 may include a conventional HRSG configuration, such as those used in conventional combined cycle power systems, and/or may be embodied as another type of heat exchanger or similar component for using exhaust energy to produce steam. For example, HRSG 134 may include a thermally conductive pipe, line, etc., with water therein such that water in HRSG 134 is heated by exhaust 136 (FIG. 1) to produce steam flow(s) 138. HRSG 134 may be fluidly connected to both gas turbine system 102 and steam turbine system 104 via piping (numbering omitted), described further herein.

In operation, steam from steam source 132 (e.g., HRSG 134 and perhaps other sources) is directed through steam flow pipes of a water steam cycle (WSC) system 133, and enter an inlet of HP segment 126, IP segment 128 and/or LP segment 130. Steam is channeled therein to impart a force on blades thereof causing shaft 124 (FIG. 1) to rotate. As understood, steam from an upstream turbine may be employed later in a downstream turbine. The steam thus produced by steam source 132 drives at least a part of steam turbine system 104 in which work is extracted to drive shaft 124 and an additional load such as second generator 122 which, in turn, produces additional electric power. It is understood that steam source 132 may take another form where STE system 104 is not part of a combined cycle power plant.

It is understood that generators 108, 122 and shafts 106, 124 may be of any size or type known in the art and may differ depending upon their application or the system to which they are connected. Common numbering of the generators and shafts is for clarity and does not necessarily suggest these generators or shafts are identical.

In another embodiment, shown in FIG. 2, a power plant 140 may include a single shaft combined cycle power plant that includes a single generator 142 coupled to both gas turbine system 102 and steam turbine system 104 via a common shaft 144. Steam source 132, steam turbine system 104 and/or gas turbine system 102 may otherwise be similar to those described relative to FIG. 1. Here, also, condenser 131 may be operably coupled to an appropriate ST segment, e.g., a last-in-line segment such as LP segment 130 (axial condenser arrangement). Again, conventional condenser systems 131 include a symmetrical outer casing having a heat exchanger 135 therein to condense steam. Each condenser system 131 is custom designed and built at a location of power plant 140 (FIG. 2).

However embodied, power plant 100 (FIG. 1), 140 (FIG. 2) may incorporate any now known or later developed control system (not shown) to provide automated control of systems thereof, e.g., steam source 132, and steam turbine system 104, and, where provided, gas turbine system 102. As shown in FIGS. 1 and 2, steam flows 138 from steam source 132 (e.g., HRSG 134) are fed to steam turbine system 104 using WSC system 133. Each steam flow 138 (FIGS. 1 and 2) is provided in a respective steam flow pipe of WSC system 133. While particular schematic examples of a power plant have been provided in FIGS. 1-2, it is understood that various alternative arrangements exist including, for example, less ST segments 126, 128, 130.

Figure 3:
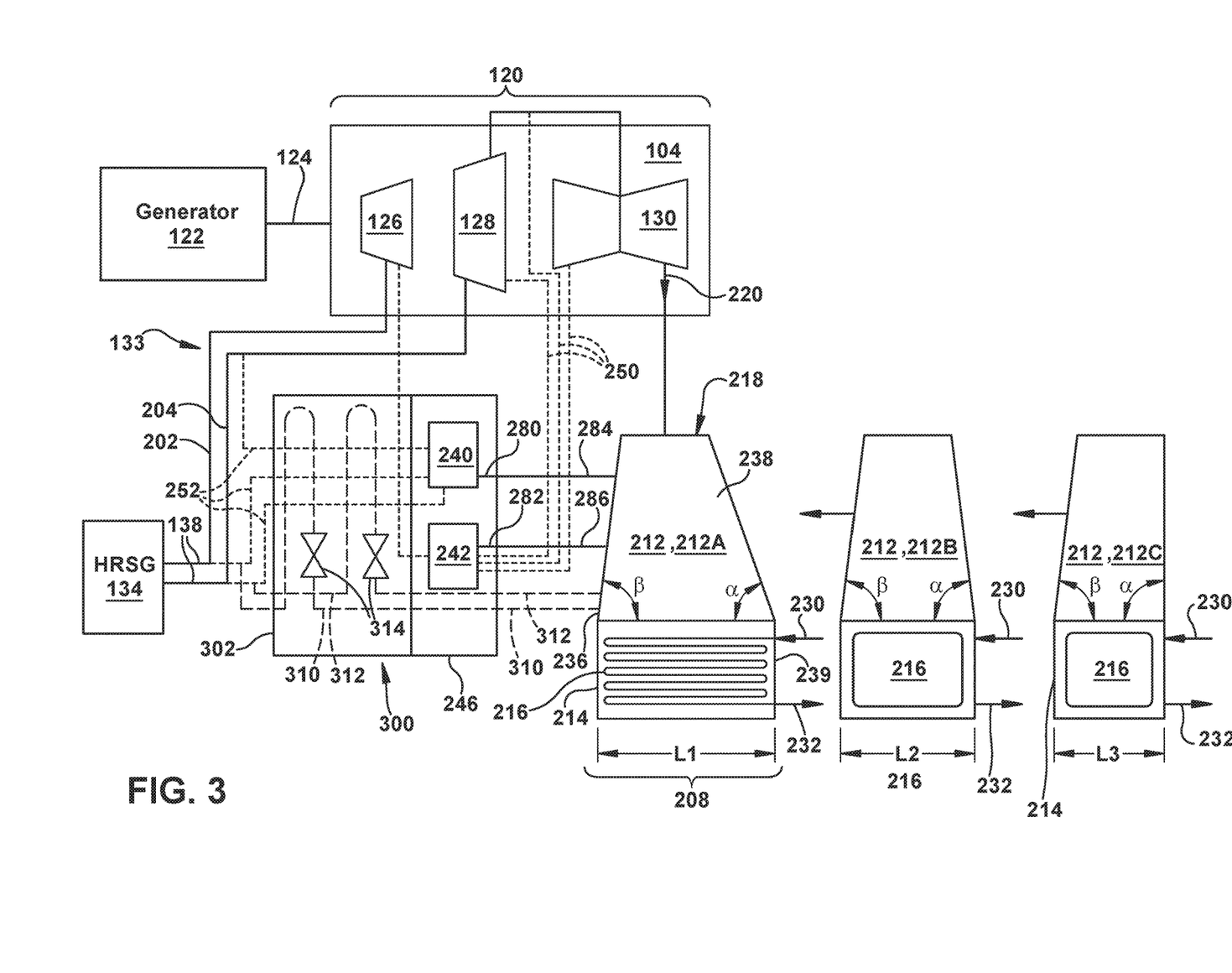
FIG. 3 shows a schematic plan view of a condenser system and condensate vessel assembly, according to embodiments of the disclosure.

FIG. 3 shows a schematic view of an illustrative power plant with no GT system 102 (FIGS. 1 and 2). FIG. 3 also shows details of an adjustable condenser system 208 (hereinafter "condenser system 208") and condensate vessel assembly 210, according to embodiments of the disclosure. As understood in the art, condenser system 208 collects steam from various sources and in various stages of condensation, to fully condense the steam, e.g., for reuse by steam source 132 such as an HRSG 134. In contrast to conventional systems, condenser system 208 may include a selectively sized outer casing 212. That is, outer casing 212 may be sized to the load requirement, e.g., based on power plant size, ST system 104 size, steam/condensate expected load, and other environment attributes of where the power plant is located. For example, a power plant may have a larger condensation load requirement depending on where it is located, e.g., in a marine environment compared to a desert environment, which may require a larger outer casing 212 to accommodate, e.g., the necessary heat exchanger 216, condensate volume, internal piping, etc. In FIG. 3, three illustrative sizes of outer casing are shown for illustration, e.g., a large casing 212A, medium 212B and small 212C. Each outer casing 212 includes a heat exchanger end 214 for enclosing a heat exchanger 216 (shown in detail only in large casing 212A). An opposite, input end 218 of outer casing 212 is coupled to an exhaust 220 of ST system 104, e.g., of LP segment 130. Heat exchanger 216 has a variable size depending on a load requirement for condenser system 208. For example, each heat exchanger 216 may have a different length (left-to-right on the page), e.g., L1>L2>L3. It is understood that heat exchanger 216 may vary in size in a number of ways other than length, e.g., number of cooling coils, width (up-down on page), height (into and out of page), etc. In any event, the size of heat exchanger is selected to handle a particular load requirement for the power plant.

With continuing reference to FIG. 3, selectively sized outer casing 212 allows for condenser system 208 to be custom sized without requiring on-site manufacture. Outer casing 212 also has an upper and lower wall (not labeled), a first sidewall 236 (left side, as shown), and an opposing, second sidewall 238 (right side, as shown). First sidewall 236 is referred to herein as a 'condensate vessel sidewall' due to its proximity to condensate vessel assembly 210, according to embodiments of the disclosure, and second sidewall 238 is referred to herein as a 'cooling water sidewall' 238 due to its proximity to cooling water pipes 230, 232. It is understood that the names are not considered limiting as to what structure must be proximate each sidewall. Each sidewall 236, 238 extends between input end 218 and heat exchanger end 214. In accordance with embodiments of the disclosure, condensate vessel sidewall 236 is configured to receive exhausted steam from at least one of first and second condensate vessels 240, 242 of condensate vessel assembly 210, via piping 284, 286 described in greater detail herein. As can be observed by comparing casings 212A, 212B, 212C, condensate vessel sidewall 236 is positionally uniform relative to heat exchanger end 214 and input end 218 regardless of the size of heat exchanger 216. That is, the change in size of heat exchanger 216 does not cause the position of condensate vessel sidewall 236 to change regardless of what size heat exchanger is required. In particular, an angle θ between condensate vessel sidewall 236 and heat exchanger 216 is constant. In this manner, every condenser system 208, regardless of load requirements, does not have to be custom built relative to this sidewall, which provides a number of benefits such as the ability to modularize condensate vessels 240, 242, described in greater detail herein. In addition, the arrangement provides flexibility in design and reduces the complexity and costs of building the power plant because, among other things, parts can be made off-site and transported to the site.

FIG. 3 also shows cooling water sidewall 238 is on an opposite side of condenser system 208 from condensate vessel sidewall 236. In the example shown, sidewall 238 is adjacent to cooling water pipes 230, 232 that deliver cooling water to and from heat exchanger 216, i.e., through a casing wall 239 of heat exchanger 216 adjacent cooling water sidewall 238. Cooling water pipes 230, 232 may provide cooling water from any now known or later developed supply device or ambient source, e.g., lake, river, etc. (Pumps controlling flow of cooling water are omitted for clarity). In contrast to conventional condenser system casings, in accordance with embodiments of the disclosure, sidewall 238 (here, sidewall that receives cooling water pipes 230, 232) position relative to heat exchanger end 214 and input end 218 changes depending on the size of heat exchanger 216. For example, an angle α between sidewall 238 and heat exchanger 216 may vary, e.g., near 90° for small casing 212C, around 85° for medium-sized casing 212B, and around 75° for larger casing 212A. The angle may have any size desired. Further, the length of sidewall 238 between input end 218 and heat exchanger end 214 may change. As observed in FIG. 3, due to the variation of position of cooling water sidewall 226, outer casing 212 is not always horizontally symmetrical, i.e., it is typically horizontally non-symmetrical. Cooling water pipes 230, 232 and custom support structures (not shown) can be built off-site and transported to the site to accommodate the differences in position of sidewall 238, e.g., relative to where cooling water pipes 230, 232 normally couple to the sidewall. Cooling water pipes 230, 232 are typically laminated. Accordingly, such off-site custom building removes the need to perform pipe laminations on-site, further reducing complexity and costs.

FIG. 3 also shows a schematic plan view of condensate vessel assembly 210. Condensate vessel assembly 210 allows for condensate vessels to be removed from condenser system 208, and modularized to take advantage of additional floor space provided by re-routing of thermal expansion loops (not shown) for steam flow pipes 202, 204. Condensate vessel assembly 210 may include a support structure 246. In addition, condensate vessel assembly 210 includes a first condensate vessel 240 and a second condensate vessel 242. Each condensate vessel 240, 242 may include any now known or later developed vessel capable of receiving and retaining steam condensate typically found in a power plant, and may be mounted in support structure 246 in any fashion. That is, each condensate vessel 240, 242 is positioned on first support structure 246. However, in contrast to conventional condensate vessels, condensate vessels 240, 242 may be cubical to, for example, eliminate the radial nature of how ST internal condensate drain pipes 250 or WSC external condensate drain pipes 252 couple to conventional circular condensate vessels. The cubical nature of condensate vessels 240, 242 also more readily accommodate mounting on support structure 246, and better accommodates coupling to intake lines 270, 272 (FIG. 6), described in greater detail herein. As shown in FIG. 3, first condensate vessel 240 is configured to receive steam condensate from a plurality of ST internal condensate drain pipes 250 of ST system 104. Each ST internal condensate drain pipe 250 may drain steam condensate from a portion of a respective ST segment 126, 128, 130. The steam drained from ST segments 126, 128, 130 may include steam not used to create work and water condensed from the steam working fluid. In contrast, second condensate vessel 242 is configured to receive steam condensate from a plurality of WSC external condensate drain pipes 252 coupled, where necessary, to steam flow pipes 202, 204 of WSC system 133 for ST system 104. As understood in the art, steam flow pipes 202, 204 are coupled to respective manifolds (not shown) in HRSG 134 that supply the appropriate pressure steam to ST system 104. Each steam flow pipe of WSC system 133, e.g., 202, 204 among potentially many others, may include one or more WSC external condensate drain pipes 252 in which steam condensate, e.g., steam, hot water or a combination thereof, is collected and removed for delivery to first condensate vessel 240. Any necessary number of WSC external condensate drain pipes 252 may be coupled to any number of steam flow pipes 202, 204 to collect condensate therefrom. Steam condensate flows to condensate vessels 240, 242 via gravity feed. As shown, second condensate vessel 242 is slightly larger than first condensate vessel 240, but this is not necessary in all instances.

Figure 4:
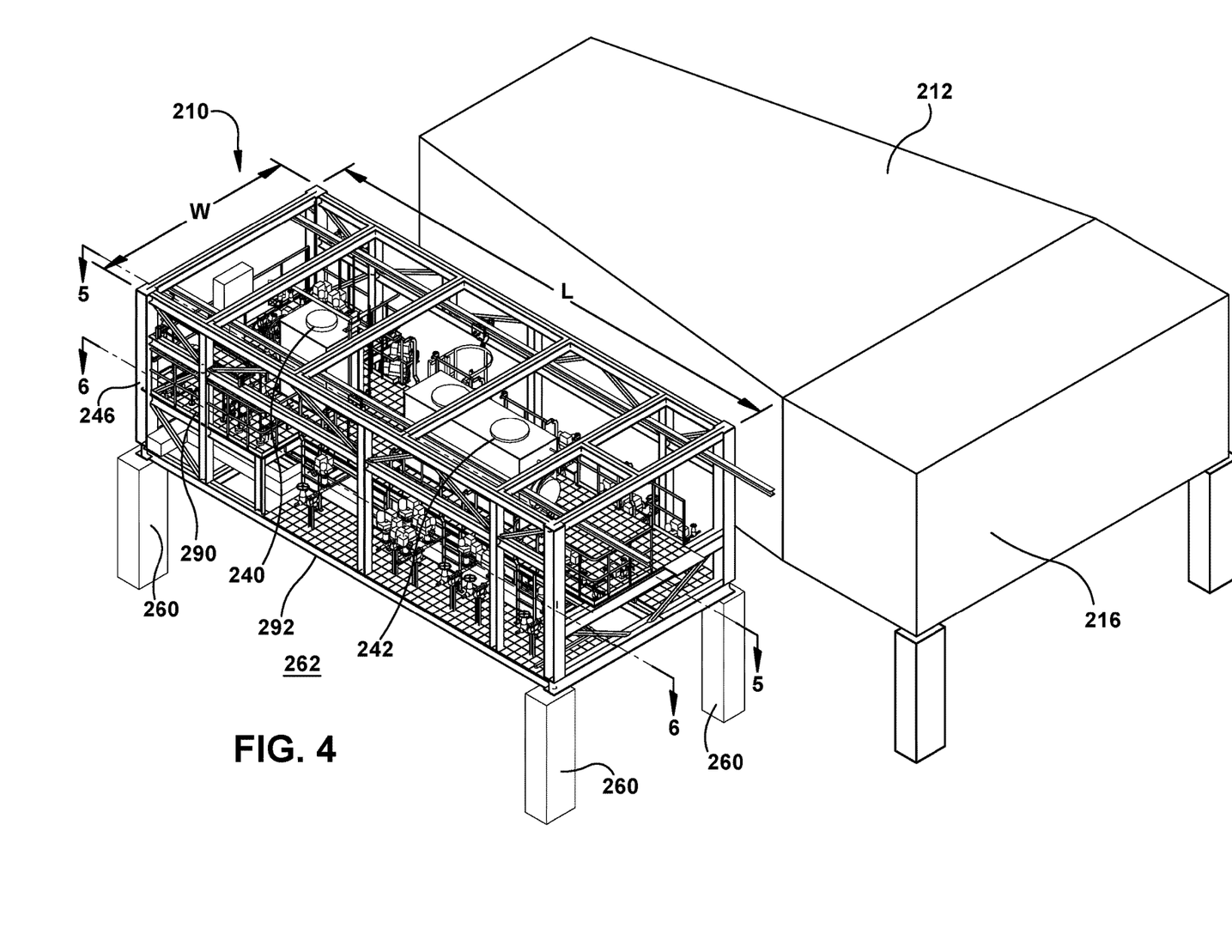
FIG. 4 shows a perspective view of a condensate vessel assembly, according to embodiments of the disclosure.

FIG. 4 shows a perspective view of condensate vessel assembly 210, and support structure 246. As shown, support structure 246 is freestanding from condenser system 208, e.g., outer casing 212. Support structure 246 may include support legs 260, or may be positioned on floor 262 of a power plant. Support structure 246 may include any form of metal frame structure capable of supporting vessels 240, 242 and related structure, described herein. Condensate vessel assembly 210 can be manufactured off-site from the power plant, and transported to the site. In this regard, condensate vessel assembly 210 can be modular and, in particular, support structure 246 may be shaped and sized to accommodate transport. In one non-limiting example, support structure 246 is cubical, so as to fit onto conventional transport vehicles such as but not limited to a flatbed truck, flatbed boat (barge) or flatbed train car. Further, support structure 246 may be sized to be transportable on a flatbed vehicle. For example, it may be no more than 5 meters wide (W) and 4 meters high (H). Length may vary depending on the potential transport vehicle length. Other size vehicles may also be possible.

Figure 5:
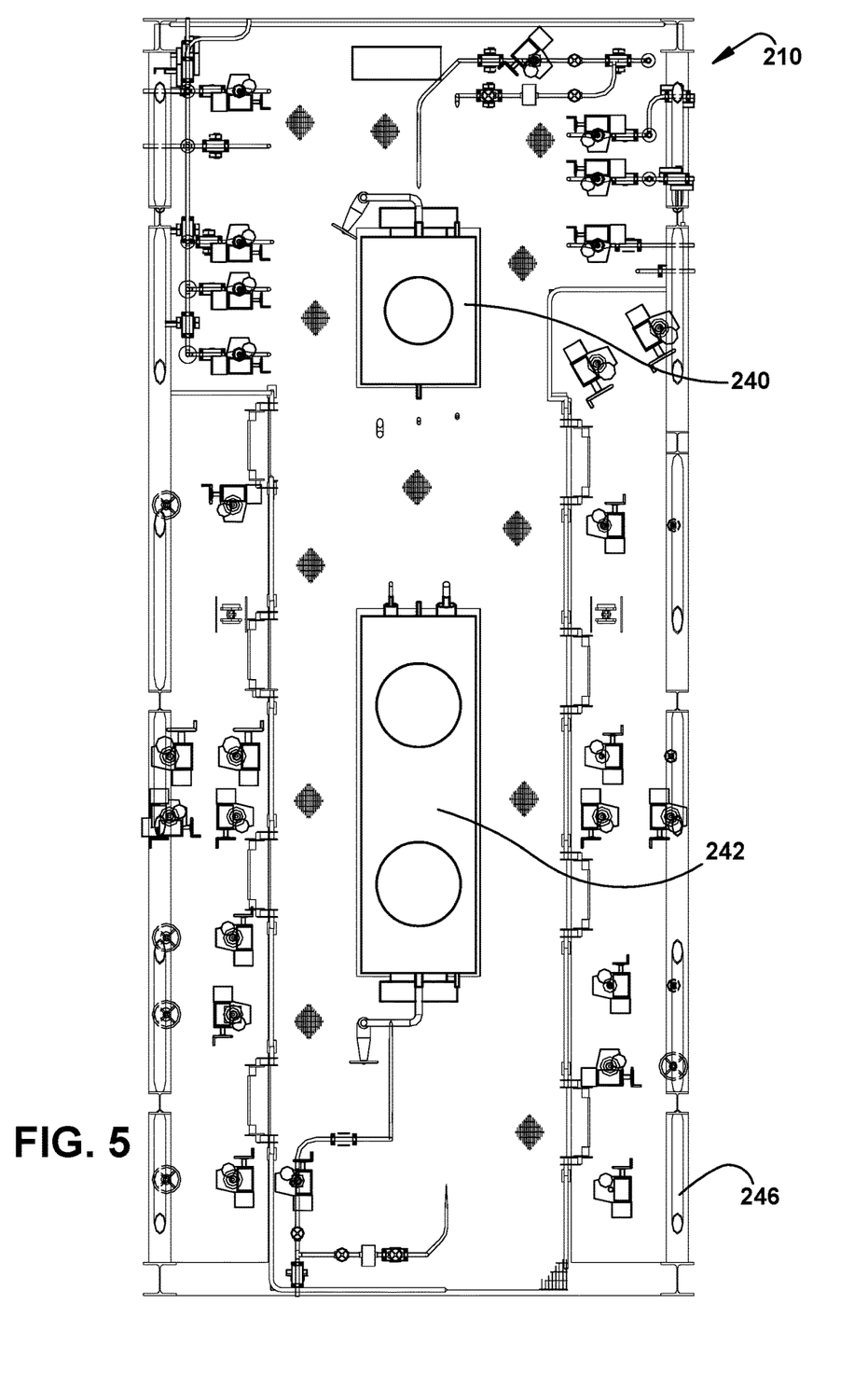
FIG. 5 shows a plan view of the condensate vessel assembly along line 5-5 in FIG. 4, according to embodiments of the disclosure.
Figure 6:
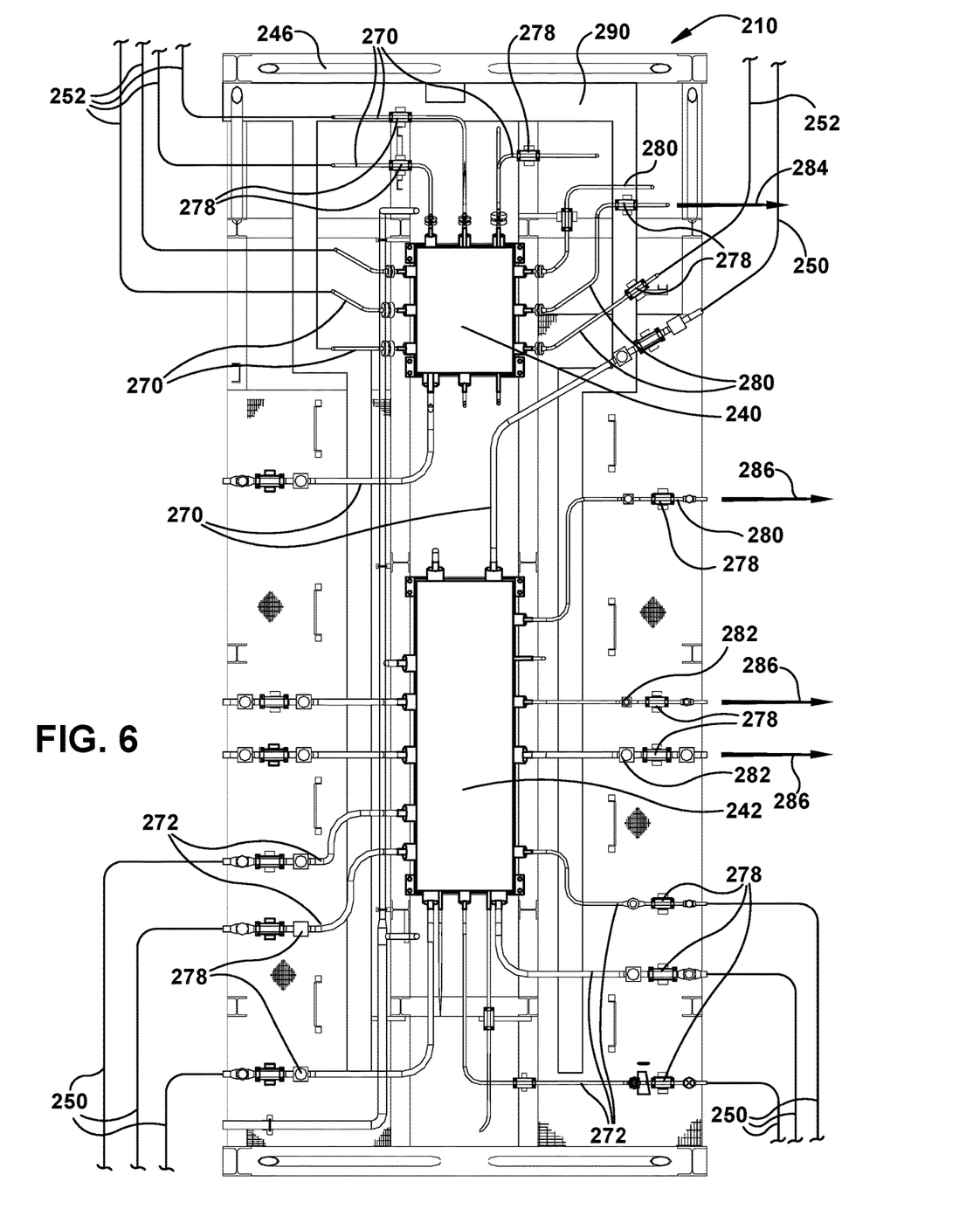
FIG. 6 shows a plan view of the condensate vessel assembly along line 6-6 in FIG. 4, according to embodiments of the disclosure.

FIG. 5 shows a plan view of condensate vessel assembly 210 through line 5-5 in FIG. 4, and FIG. 6 shows a plan view of condensate vessel assembly 210 through line 6-6 in FIG. 4. As shown best in FIG. 6, condensate vessel assembly 210 also includes a plurality of intake lines 270 mounted on support structure 246. Each intake line 270 may be configured to fluidly connect to a respective one of plurality of drain pipes 252 to first condensate vessel 240. Similarly, condensate vessel assembly 210 also has a plurality of intake lines 272 mounted on support structure 246. Each intake line 272 may be configured to fluidly connect to a respective one of plurality of condensate pipes 250 to second condensate vessel 242. One or more of intake lines 270, 272 may include a control valve 278 to open and close flow of condensate through the respective intake line. Condensate vessel assembly 210 may also include one or more output lines 280, 282 from each condensate vessel 240, 242, respectively. As shown in FIG. 3, each output line 280, 282 may be configured to fluidly couple to condenser intake pipes 284, 286 that deliver collected condensate to condenser system 208, e.g., for collection with condensate created by condenser system 208. One or more of output line(s) 280, 282 may include a control valve 278 to open and close flow of condensate through the respective intake line. Condensate vessel assembly 210 can be manufactured with any desired number of intake lines 270, 272 and/or output lines 280, 282 off-site from the power plant, and each line can then be couple to the desired pipes 250, 252, 284, 286 on-site, thus reducing power plant manufacturing complexity and costs.

As shown best in FIG. 4, condensate vessel assembly 210 may also include a variety of access structures for a user (not shown). In one non-limited example, assembly 210 may include an access and maintenance platform 290 mounted to first support structure 246, e.g., above control valve(s) 278 for supporting a human, or other structures. Another access and maintenance platform 292 may be optionally mounted to first support structure 246 below control valve(s) 278, e.g., for supporting a human, or other structures.

Figure 7:
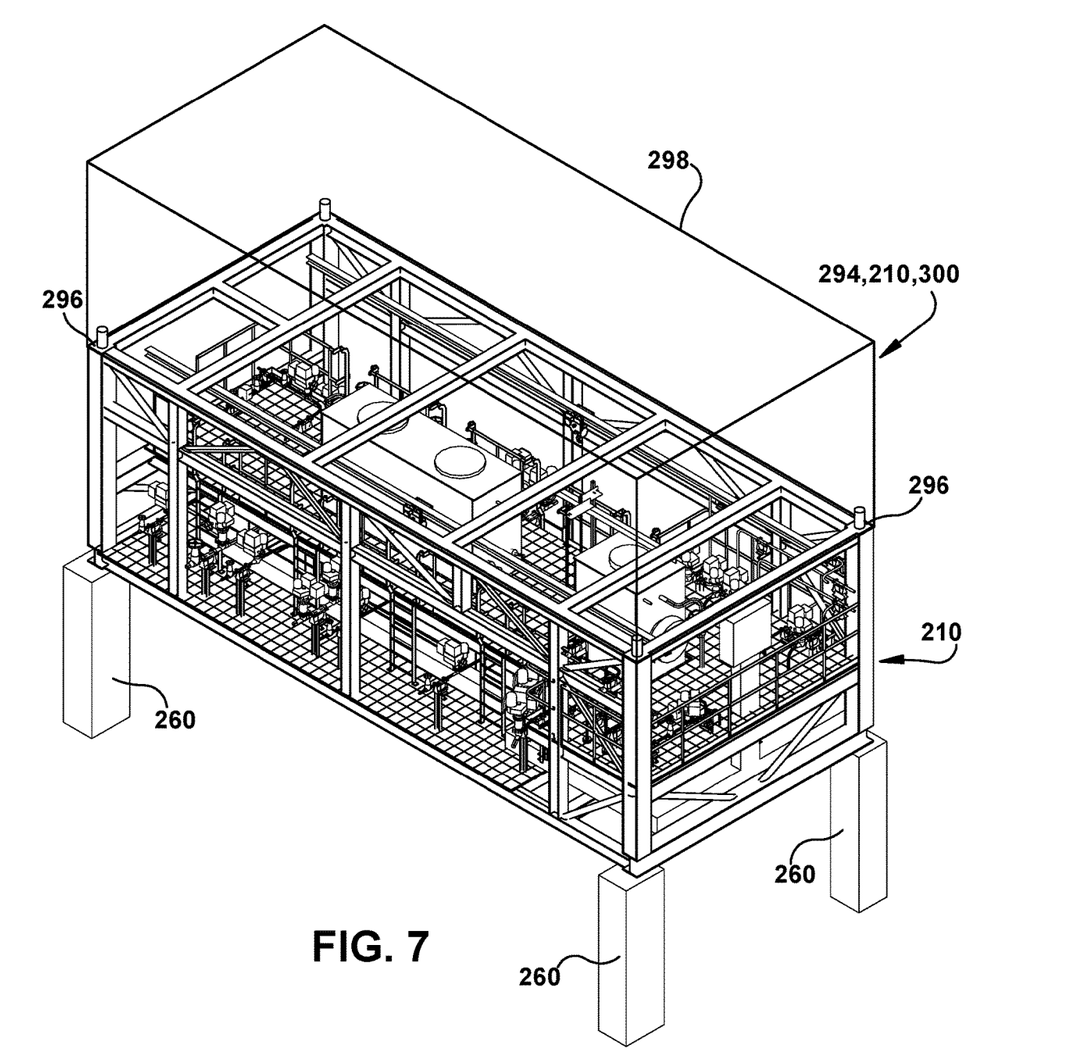
FIG. 7 shows a perspective view of the condensate vessel assembly, according to another embodiment of the disclosure.

As shown in FIG. 7, in an alternative embodiment, condensate vessel assembly 210 may also allow for either another condensate vessel assembly 210 or another modular assembly 294, e.g., for other power plant equipment, to be mounted therewith. In this regard, condensate vessel assembly 210 may include a mounting system 296 on an upper or lower end (only upper shown) of support structure 246 to mount another support structure 298 to support structure 246. Mounting system 296 may include any now known or later developed system for mounting frame structures together, e.g., hole and pin alignment mechanisms, welds, mounting brackets, etc.

In another embodiment, shown in FIG. 3, a steam bypass assembly 300 may be operatively coupled to but freestanding from selectively sized outer casing 212. Steam bypass assembly 300 may include a support structure 302, similar to support structure 246 (FIG. 3) or 298 (FIG. 7). Support structure 300 may be atop support structure 246 like support structure 298 in FIG. 7, adjacent support structure 246 as shown in FIG. 3, or include a stacked lower and upper support structure like that of structures 246 and 298 (FIG. 7). In any event, second support structure 302 is freestanding from selectively sized outer casing 212 of condenser system 208. Steam bypass assembly may include a plurality of steam bypass pipes 310, 312 (only two shown for clarity, but could be more or less) positioned on the second support structure 202. Each steam bypass pipe 310, 312 is configured to direct steam from a steam source, e.g., HRSG 134, for ST system 104 to first sidewall 236 of outer casing 212 of condenser system 208. A plurality of control valves 314 may be operatively coupled to the plurality of bypass pipes 310, 312 for controlling flow of steam to ST system 104 and condenser system 208, e.g., during a startup phase in which steam is produced by HRSG 134 but diverted from ST system 104 to condenser system 208. The positioning and modularization of steam bypass piping allows steam bypass assembly to be manufactured off-site, and provide additional flexibility to the power plant.

It is also noted that condenser system 208 and/or assemblies 210, 300 allow for all steam or condensate intake pipes 284, 286, and bypass pipes 310, 312, among others, passing to condenser system 208 to enter through a single, sidewall 236 extending between input end 218 and heat exchanger end 214. In this fashion, manufacture of condenser system 208 and the power plant can be simplified.

Condenser system 208, condensate vessel assembly 210 and/or steam bypass assembly 300 provide systems that alone or in combination provide for a more compactness of structure for a power plant 100, 140 (FIGS. 1-2) and thus a smaller building. Further, the modularity provided by both system 208, assembly 210 and/or assembly 300 simplifies the amount of custom manufacture necessary on-site at the power plant. Condenser system 208 can be at least partially built off-site, and assembly 210 and/or assembly 300 can be built completely off-site, thus saving on-site manufacturing complexity and expense. System 208, assembly 210 and/or assembly 300 also provide for increased flexibility, e.g., ability to place condensate vessels and/or steam bypass piping, where desired rather than on the condenser, ability to size condenser system according to required load and not have to alter both sides of its casing, and more efficiently take advantage of available floor space of the power plant, etc. Condenser system 208 also provides manufacturing repeatability in that multiple power plant projects can benefit from a single approach, saving on engineering effort and time needed to develop custom project arrangements. In addition, since condenser system 208 dimensions are known, space for other systems is reserved in advance, and, where custom arrangements are still required, more room is available to accommodate the variation in condenser sizing.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A condensate vessel assembly for a condenser system of a power plant, the assembly comprising:
   a first support structure freestanding from the condenser system;
   a first condensate vessel positioned on the first support structure, the first condensate vessel configured to receive steam condensate from a plurality of drain pipes of a steam turbine system;
   a second condensate vessel positioned on the first support structure, the second condensate vessel configured to receive steam condensate from a plurality of condensate pipes of a water steam cycle system for the steam turbine system;
   a first plurality of intake lines mounted on the first support structure, each first intake line configured to fluidly connect to a respective one of the plurality of drain pipes to the first condensate vessel; and
   a second plurality of intake lines mounted on the first support structure, each second intake line configured to fluidly connect to a respective one of the plurality of condensate pipes to the second condensate vessel.

2. The assembly of claim 1, wherein each condensate vessel is cubical.

3. The assembly of claim 1, wherein the first support structure is cubical.

4. The assembly of claim 1, wherein the first support structure is sized to be transportable on a flatbed vehicle.

5. The assembly of claim 1, wherein at least one intake line of the first and second plurality of intake lines includes a control valve.

6. The assembly of claim 5, further comprising an access and maintenance platform mounted to the first support structure above the at least one control valve.

7. The assembly of claim 1, further comprising a mounting system on an upper end of the first support structure, the mounting system configured to mount a second support structure to the first support structure.

8. The assembly of claim 1, wherein the condenser system includes:
   a selectively sized outer casing having:
      a heat exchanger end for enclosing a heat exchanger, the heat exchanger having a variable size depending on a load requirement for the condenser system;
      an input end for coupling to an exhaust of a steam turbine system,
      a first sidewall extending between the input end and the heat exchanger end, the first sidewall configured to receive steam condensate from at least one of the first and second condensate vessels, the first sidewall being positionally uniform relative to the heat exchanger end and the input end regardless of the size of the heat exchanger; and
      a second sidewall extending between the input end and the heat exchanger end, the second sidewall position relative to the heat exchanger end and the input end depending on the size of the heat exchanger.

9. A condenser system for steam turbine systems having different loads, the condenser system comprising:
   a selectively sized outer casing having:
      a heat exchanger end for enclosing a heat exchanger, the heat exchanger having a variable size depending on a load requirement for the condenser system;
      an input end for coupling to an exhaust of a steam turbine system,
      a first sidewall extending between the input end and the heat exchanger end, the first sidewall configured to receive exhausted steam from at least one of a first and second condensate vessel, the first sidewall being positionally uniform relative to the heat exchanger end and the input end regardless of the size of the heat exchanger; and
      a second sidewall opposite the first sidewall, the second sidewall extending between the input end and the heat exchanger end, the second sidewall position relative to the heat exchanger end and the input end depending on the size of the heat exchanger;
   a condensate vessel assembly operatively coupled to but freestanding from the selectively sized outer casing, the condensate vessel assembly including:
      a first support structure freestanding from the selectively sized outer casing of the condenser system;
      wherein the first condensate vessel is positioned on the first support structure, the first condensate vessel configured to receive steam condensate from a plurality of drain pipes of a steam turbine system;
   a first plurality of intake lines mounted on the first support structure, each first intake line configured to fluidly connect to a respective one of the plurality of drain pipes to the first condensate vessel;
   a second plurality of intake lines mounted on the first support structure, each second intake line configured to fluidly connect to a respective one of the plurality of condensate pipes to the second condensate vessel; and
   wherein the second condensate vessel is positioned on the first support structure, the second condensate vessel configured to receive steam condensate from a plurality of condensate pipes of a water steam cycle system for the steam turbine system.

10. The condenser system of claim 9, wherein the outer casing is horizontally non-symmetrical.

11. The condenser system of claim 9, wherein each condensate vessel is cubical.

12. The condenser system of claim 9, wherein the first support structure is cubical.

13. The condenser system of claim 9, wherein the first support structure is sized to be transportable on a flatbed vehicle.

14. The condenser system of claim 9, wherein at least one intake line of the first and second plurality of intake lines includes a control valve.

15. The condenser system of claim 9, further comprising an access and maintenance platform mounted to the first support structure.

16. The condenser system of claim 9, further comprising a steam bypass assembly operatively coupled to but freestanding from the selectively sized outer casing, the steam bypass assembly including:
   a second support structure freestanding from the selectively sized outer casing of the condenser system;
   a plurality of steam bypass pipes positioned on the second support structure, the plurality of steam bypass pipes configured to direct steam from a steam source for the steam turbine system to the first sidewall of the condenser system; and a plurality of control valves operatively coupled to the plurality of bypass pipes for controlling flow of steam to the steam turbine system and the condenser system.

17. The condenser system of claim 9, wherein all steam or condensate input pipes to the condenser system enter through the first sidewall extending between the input end and the heat exchanger end.

18. A condenser system for steam turbine systems having different loads, the condenser system comprising:

a selectively sized outer casing having:
- a heat exchanger end for enclosing a heat exchanger, the heat exchanger having a variable size depending on a load requirement for the condenser system;
- an input end for coupling to an exhaust of a steam turbine system,
- a first sidewall extending between the input end and the heat exchanger end, the first sidewall configured to receive exhausted steam from at least one of a first and second condensate vessel, the first sidewall being positionally uniform relative to the heat exchanger end and the input end regardless of the size of the heat exchanger;
- a second sidewall opposite the first sidewall, the second sidewall extending between the input end and the heat exchanger end, the second sidewall position relative to the heat exchanger end and the input end depending on the size of the heat exchanger;

a steam bypass assembly operatively coupled to but freestanding from the selectively sized outer casing, the steam bypass assembly including:
- a second support structure freestanding from the selectively sized outer casing of the condenser system;
- a plurality of steam bypass pipes positioned on the second support structure, the plurality of steam bypass pipes configured to direct steam from a steam source for the steam turbine system to the first sidewall of the condenser system; and
- a plurality of control valves operatively coupled to the plurality of bypass pipes for controlling flow of steam to the steam turbine system and the condenser system.

* * * * *